(12) United States Patent
Larson

(10) Patent No.: US 7,213,855 B2
(45) Date of Patent: May 8, 2007

(54) HEARSE ASSEMBLY

(76) Inventor: Dickie L. Larson, P.O. Box 18, Battle Ground, IN (US) 47920-0018

( * ) Notice: Subject to any disclaimer, the term of this patent is extended or adjusted under 35 U.S.C. 154(b) by 424 days.

(21) Appl. No.: 10/794,277

(22) Filed: Mar. 8, 2004

(65) Prior Publication Data

US 2005/0194200 A1 Sep. 8, 2005

(51) Int. Cl.
A61G 21/00 (2006.01)
(52) U.S. Cl. .................... 296/16; 180/22; 180/24.04; 180/253; 280/781
(58) Field of Classification Search ................ 280/62, 280/781; 180/375, 22, 24.04, 253, 311, 24.01, 180/211; 296/16; D34/19; D12/96, 85, D12/112
See application file for complete search history.

(56) References Cited

U.S. PATENT DOCUMENTS

| | | | | |
|---|---|---|---|---|
| D59,359 S | * | 10/1921 | Kawanami | ................... D12/85 |
| 2,265,434 A | | 12/1941 | Kibbey | |
| 2,530,041 A | * | 11/1950 | Bennett | ....................... 56/13.6 |
| D165,690 S | | 1/1952 | Kistler | |
| 2,666,666 A | | 1/1954 | Schneider et al. | |
| D190,367 S | * | 5/1961 | Kenichi et al. | .............. D12/85 |
| D205,175 S | | 6/1966 | Stamback | |
| D205,490 S | | 8/1966 | Bell | |
| D229,986 S | | 1/1974 | Widgren et al. | |
| 3,924,706 A | * | 12/1975 | Figura | ..................... 180/89.14 |
| D246,778 S | | 12/1977 | Cognata | |
| 4,223,913 A | * | 9/1980 | Fry | ............................ 280/771 |
| D301,128 S | * | 5/1989 | Simon | ......................... D12/15 |
| D316,696 S | * | 5/1991 | Haag et al. | ................ D12/196 |
| 5,343,973 A | * | 9/1994 | Lanker | ....................... 180/211 |
| 6,059,056 A | * | 5/2000 | Becker | ..................... 180/24.01 |
| 6,196,617 B1 | * | 3/2001 | Beck | ..................... 296/146.11 |
| 6,957,710 B2 | * | 10/2005 | Oates | ..................... 180/24.11 |
| 7,134,829 B2 | * | 11/2006 | Quenzi et al. | ............. 414/482 |
| 2004/0050596 A1 | * | 3/2004 | Shimizu | ................. 180/24.01 |

* cited by examiner

Primary Examiner—Paul N. Dickson
Assistant Examiner—Timothy Wilhelm

(57) ABSTRACT

A hearse assembly includes a support frame that has a substantially rectangular shape and has a forward end and rearward end. A tricycle frame includes a motor and has a back portion and a front portion. The back portion is integrally coupled to the forward end. A steering column and wheel combination is coupled to the front portion. A first axle is mounted on the support frame and is positioned nearer the forward end. A first differential is mechanically coupled to the first axle. A first drive shaft mechanically couples the motor to the first differential. A second axle is mounted the support frame and is positioned nearer the rearward end. The first and second axles each have a pair of free ends each having a wheel attached thereto. A housing is mounted the support frame. A door is positioned in the housing for selectively opening or closing the housing.

18 Claims, 4 Drawing Sheets

HEARSE ASSEMBLY

BACKGROUND OF THE INVENTION

1. Field of the Invention

The present invention relates to hearse devices and more particularly pertains to a new hearse device for transporting a casket.

2. Description of the Prior Art

The use of hearse devices is known in the prior art. While these devices fulfill their respective, particular objectives and requirements, the need remains for a device that resembles a motorcycle for allowing casket to be transported within a vehicle that resembles a motorcycle. This provides additional options over traditional caskets and allows a person to be transported in a manner that may be more meaningful to them.

SUMMARY OF THE INVENTION

The present invention meets the needs presented above by generally comprising a support frame that has a substantially rectangular shape and has a forward end and rearward end. The support frame is elongated and has a length greater than 10 feet. A tricycle frame has a back portion and a front portion. The back portion is integrally coupled to the forward end of the support frame. A steering column and wheel combination is coupled to the front portion of the tricycle frame. A pair of handlebars is attached to an upper end of the steering column. A motor is mounted on the tricycle frame. A first axle is mounted on a bottom side of the support frame. The first axle is positioned nearer the forward end than the rearward end of the support frame. The first axle has a pair of free ends. A first differential is mechanically coupled to the first axle for selectively rotating of the free ends of the first axle. A first drive shaft mechanically couples the motor to the first differential. A second axle is mounted on the bottom side of the support frame and is positioned nearer the rearward end than the forward end of the support frame. The second axle has a pair of free ends. Each of the free ends has a wheel attached thereto. A housing is mounted on a top side of the support frame and generally extends along a length thereof. A door is positioned in the housing for selectively opening or closing the housing.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
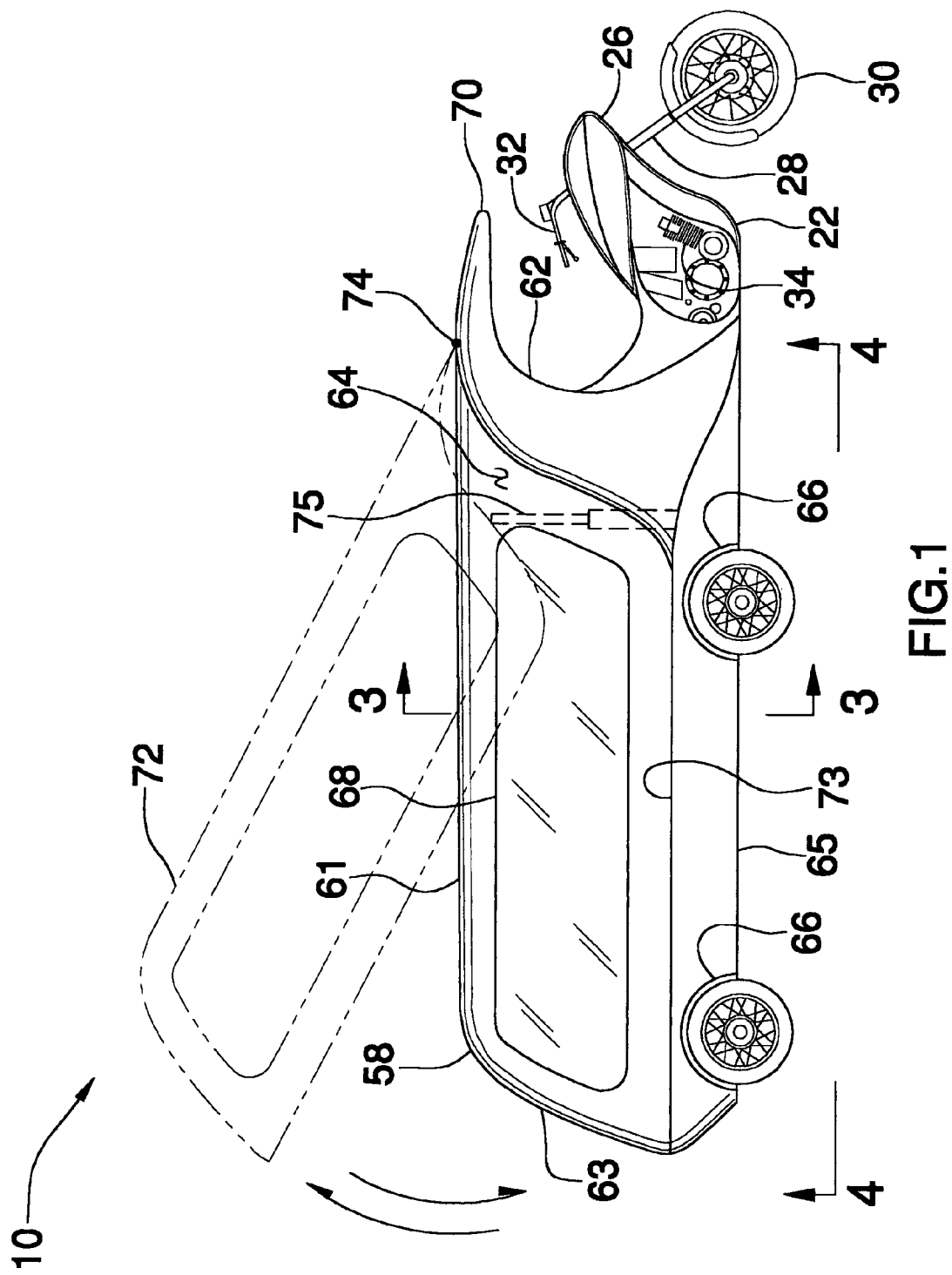
FIG. 1 is a schematic side view of a hearse assembly according to the present invention.
Figure 2:
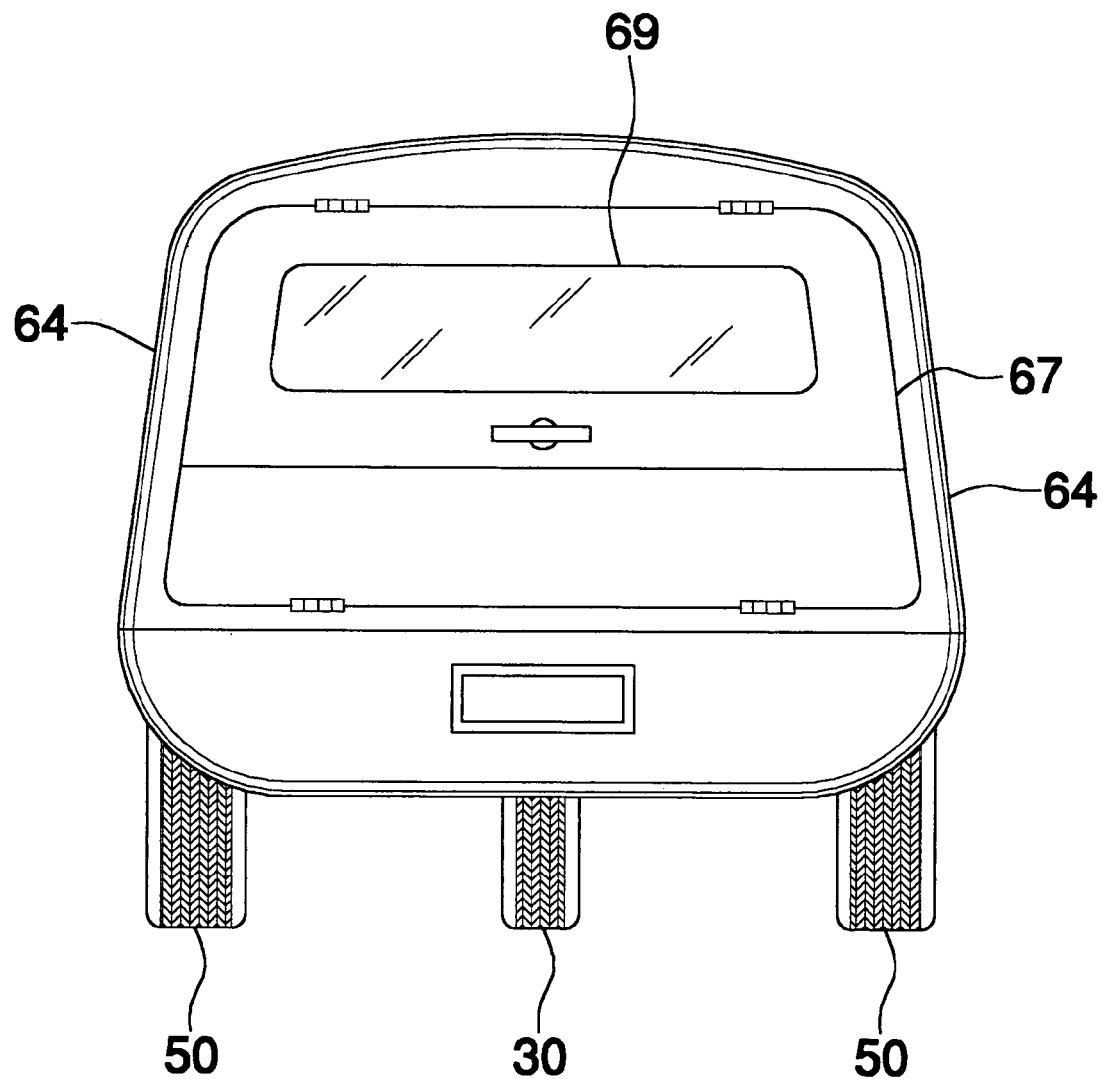
FIG. 2 is a schematic back view of the present invention.
Figure 3:
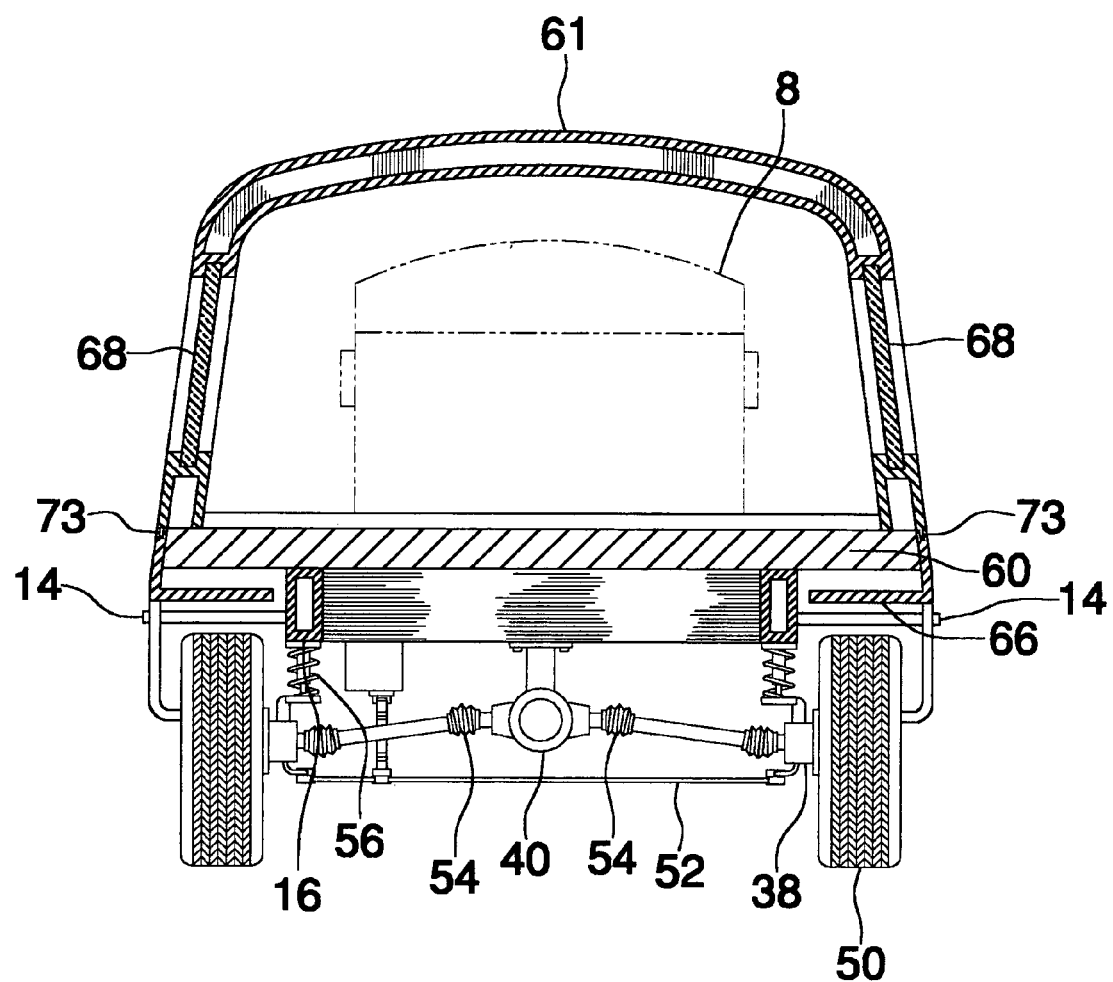
FIG. 3 is a schematic cross-sectional view taken along line 3—3 of FIG. 1 of the present invention.
Figure 4:
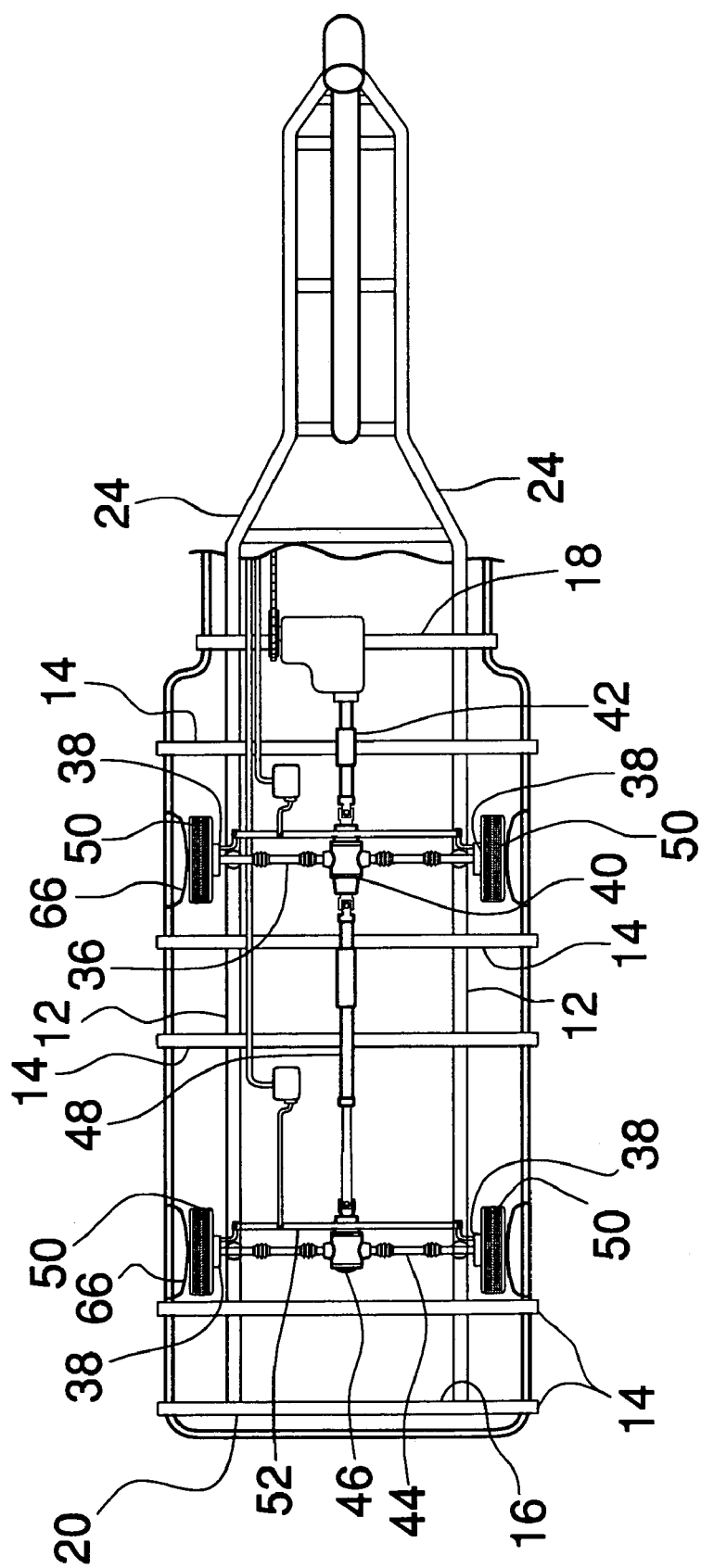
FIG. 4 is a schematic bottom view of the present invention.

With reference now to the drawings, and in particular to FIGS. 1 through 4 thereof, a new hearse device embodying the principles and concepts of the present invention and generally designated by the reference numeral 10 will be described.

As best illustrated in FIGS. 1 through 4, the hearse assembly 10 generally comprises a pair of elongated bars 12 that are spaced from each other and orientated substantially parallel to each other. A plurality of braces 14 is integrally attached to and extends between the bars 12 such that a support frame 16 is defined. The support frame 16 has a substantially rectangular shape and has a forward end 18 and rearward end 20. Each of the elongated bars 12 has a length greater than 10 feet and each of the braces 14 has a length of less than 6 feet.

A tricycle frame 22 has a back portion 24 and a front portion 26. The back portion 24 is integrally coupled to the forward end 18 of the support frame 16. A steering column 28 and wheel 30 combination is coupled to the front portion 26 of the tricycle frame 22. A pair of handlebars 32 is attached to an upper end of the steering column 28. A conventional motor 34 is mounted on the tricycle frame.

A first axle 36 is mounted on a bottom side of the support frame 16 and is orientated generally perpendicular to the elongated bars 12. The first axle 36 is positioned nearer the forward end 18 than the rearward 20 end of the support frame 16. The first axle 36 has a pair of free ends 38. A first differential 40 is mechanically coupled to the first axle 36 for selectively rotating of the free ends 38 of the first axle 36. A first drive shaft 42 mechanically couples, via chain or drive shaft, the motor 34 to the first differential 40.

A second axle 44 is mounted on a bottom side of the support frame 16 and is orientated generally perpendicular to the elongated bars 12. The second axle 44 is positioned nearer the rearward end 20 than the forward end 18 of the support frame 16. The second axle 44 has a pair of free ends 38. A second differential 46 is mechanically coupled to the second axle 44 for selectively rotating of the free ends 38 of the second axle 44. A second drive shaft 48 mechanically couples the first differential 40 to the second differential 46. A plurality of wheels 50 is provided. Each of the wheels 50 is attached to one of the free ends 38 of the first 36 and second 44 axles. The assembly 10 may include steering rods 52 coupled to the wheels 50 on the first 36 and second 44 axles for aiding in the turning of the assembly. Constant velocity (CV) joints 54 may be added to the first 36 and second 44 axles to enhance their turning ability. Also, suspension-enhancing devices 56 such as shock absorbers may be utilized.

A housing 58 includes a bottom wall 60, a top wall 61, a front wall 62, a rear wall 63, and a pair of lateral walls 64. The bottom wall 60 is attached to a top side of the support frame 16. The housing 58 extends along a length of the support frame 16. Each of the lateral 64, rear 63 and front 62 walls has a bottom edge 65 extending below the bottom wall 60 and a plane of the frame 16. The bottom edge 65 has a plurality of wheel wells 66 therein. Each of the wheel wells 66 is positioned adjacent to one of the wheels 50. A door 67 is positioned in the rear wall 63 of the housing 58 for selectively opening or closing the housing 58. The door 67 may include a top portion that lifts upwards and a lower portion that opens downwards. Each of a pair of windows 68 is positioned in one of the lateral walls 64. Each of the windows 68 is elongated and generally extends from the rear wall 63 to the front wall 62. An additional window 69 may also be positioned in the door 67. A covering 70 is attached to the housing 58 at a juncture of the front wall 62 and the top wall 61 and extends forward. The covering 70 is generally co-planar with the top wall.

An upper portion 72 of the housing 58 may be divided from the housing 58 along a dividing line 73 that extending through the top wall 61 adjacent to the front wall 62 and then along the bottom wall 60. The dividing line 73 then extends through the back wall 63 so that the upper portion 72 is separable from a remainder of the housing 58. It is preferred that the upper portion 72 is attached to the top wall 61 with a hinge 74. The upper portion 72 may be lifted up with the aid of a hydraulic lift 75. Alternatively, the upper portion 72 may be completely removable from a remainder of the housing 58. A seal, not shown, would be preferably positioned along the dividing line to seal a connection between the upper portion 72 and the housing 58.

In use, the assembly 10 is used as a conventional hearse in which a casket 8 would be slid into the housing 58 when the door 67 is opened. The motor 34 from the tricycle moves the assembly 10 and it is driven in the same manner as a conventional motorized tricycle.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A motorized tricycle and hearse combination device comprising:
    a support frame having a substantially rectangular shape and having a forward end and rearward end, said support frame being elongated and having a length greater than 10 feet;
    a tricycle frame having a back portion and a front portion, said back portion being integrally coupled to said forward end of said support frame, a steering column and wheel combination being coupled to said front portion of said tricycle frame, a pair of handlebars being attached to an upper end of said steering column, a motor being mounted on said tricycle frame;
    a first axle being mounted on a bottom side of said support frame, said first axle being positioned nearer said forward end tan said rearward end of said support frame, said first axle having a pair of free ends, a first differential being mechanically coupled to said first axle for selectively rotating of said free ends of said first axle, a first drive shaft mechanically coupling said motor to said first differential;
    a second axle being mounted on said bottom side of said support frame and being positioned nearer said rearward end tan said forward end of said support frame, said second axle having a pair of free ends, steering rods being coupled to said wheels on said first and second axles to aid in the turning of said device;
    a plurality of wheels, each of said wheels being attached to one of said free ends of said first and second axles;
    a housing being mounted on a top side of said support frame and generally extending along a length thereof; and
    a door being positioned in said housing for selectively opening or closing said housing.

2. The combination device of claim 1, wherein said support frame includes a pair of elongated bars being spaced from each other and orientated substantially parallel to each other, a plurality of braces being integrally attached to and extending between said bars, each of said elongated bars having a length greater than 10 feet, each of said braces having a length of less than 6 feet.

3. The combination device of claim 1, further including a second differential being mechanically coupled to said second axle for selectively rotating of said free ends of said second axle, a second drive shaft mechanically coupling said first differential to said second differential.

4. The combination device of claim 1, wherein said housing includes a bottom wall, a top wall, a front wall, a rear wall, and a pair of lateral walls, each of said lateral, rear and front walls having a bottom edge extending below said bottom wall and a plane of said frame.

5. The combination device of claim 4, wherein said bottom edge has a plurality of wheel wells therein, each of said wheel wells being positioned adjacent to one of said wheels.

6. The combination device of claim 4, further including a pair of windows, each of said windows being positioned in one of said lateral walls, each of said windows being elongated and generally extending from said rear wall to said front wall.

7. The combination device of claim 1, further including a plurality of windows being positioned in said housing.

8. The combination device of claim 4, further including a covering being attached to said housing at a juncture of said front wall and said top wall and extending forward, said covering being generally co-planar with said top wall.

9. A motorized tricycle and hearse combination device comprising:
    a pair of elongated bars being spaced from each other and orientated substantially parallel to each other, a plurality of braces being integrally attached to and extending between said bars such that a support frame is defined, said support frame having a substantially rectangular shape and having a forward end and rearward end, each of said elongated bars having a length greater than 10 feet, each of said braces having a length of less than 6 feet;
    a tricycle frame having a back portion and a front portion, said back portion being integrally coupled to said forward end of said support frame, a steering column and wheel combination being coupled to said front portion of said tricycle frame, a pair of handlebars being attached to an upper end of said steering column, a motor being mounted on said tricycle frame;
    a first axle being mounted on a bottom side of said support frame and being orientated generally perpendicular to said elongated bars, said first axle being positioned nearer said forward end than said rearward end of said support frame, said first axle having a pair of free ends, a first differential being mechanically coupled to said first axle for selectively rotating of said free ends of said first axle, a first drive shaft mechanically coupling said motor to said first differential;

a second axle being mounted on said bottom side of said support frame and being orientated generally perpendicular to said elongated bars, said second axle being positioned nearer said rearward end than said forward end of said support frame, said second axle having a pair of free ends, a second differential being mechanically coupled to said second axle for selectively rotating of said free ends of said second axle, a second drive shaft mechanically coupling said first differential to said second differential, steering rods being coupled to said wheels on said first and second axles to aid in the turning of said device;

a plurality of wheels, each of said wheels being attached to one of said free ends of said first and second axles;

a housing including a bottom wall, a top wall, a front wall, a rear wall, and a pair of lateral walls, said bottom wall being attached to a top side of said support frame, said housing extending along a length of said support frame, each of said lateral, rear and front walls having a bottom edge extending below said bottom wall and a plane of said frame, said bottom edge having a plurality of wheel wells therein, each of said wheel wells being positioned adjacent to one of said wheels;

a door being positioned in said rear wall of said housing for selectively opening or closing said housing;

a pair of windows, each of said windows being positioned in one of said lateral walls, each of said windows being elongated and generally extending from said rear wall to said front wall; and a covering being attached to said housing at a juncture of said front wall and said top wall and extending forward, said covering being generally co-planar with said top wall.

10. A motorized tricycle and hearse combination device comprising:

a support frame having a substantially rectangular shape and having a forward end and rearward end, said support frame being elongated and having a length greater than 10 feet;

a tricycle frame having a back portion and a front portion, said back portion being integrally coupled to said forward end of said support frame, a steering column and wheel combination being coupled to said front portion of said tricycle frame, a pair of handlebars being attached to an upper end of said steering column, a motor being mounted on said tricycle frame;

a first axle being mounted on a bottom side of said support frame, said first axle being positioned nearer said forward end than said rearward end of said support frame, said first axle having a pair of free ends, a first differential being mechanically coupled to said first axle for selectively rotating of said free ends of said first axle, a first drive shaft mechanically coupling said motor to said first differential;

a second axle being mounted on said bottom side of said support frame and being positioned nearer said rearward end than said forward end of said support frame, said second axle having a pair of free ends, steering rods being coupled to said wheels on said first and second axles to aid in the turning of said device;

a plurality of wheels, each of said wheels being attached to one of said free ends of said first and second axles;

a housing being mounted on a top side of said support frame and generally extending along a length thereof, said housing including a bottom wall, a top wall, a front wall, a rear wall, and a pair of lateral walls, each of said lateral, rear and front walls having a bottom edge extending below said bottom wall and a plane of said frame, said housing including an upper portion separable from a remaining portion of said housing along a dividing line extending through said top wall adjacent to said front wall and then along said bottom wall, said dividing line extending through said back wall, a hinge attaching said upper portion to said top wall;

a lift being attached to said upper portion and being configured to lift said upper portion with respect to said remaining portion of said housing.

11. The combination device of claim 10, wherein said lift is a hydraulic lift.

12. The combination device of claim 10, further including a door being positioned in said housing for selectively opening or closing said housing.

13. The combination device of claim 10 wherein said support frame includes a pair of elongated bars being spaced from each other and orientated substantially parallel to each other, a plurality of braces being integrally attached to and extending between said bars, each of said elongated bars having a length greater than 10 feet, each of said braces having a length of less than 6 feet.

14. The combination device of claim 10, further including a second differential being mechanically coupled to said second axle for selectively rotating of said free ends of said second axle, a second drive shaft mechanically coupling said first differential to said second differential.

15. The combination device of claim 10, wherein said bottom edge has a plurality of wheel wells therein, each of said wheel wells being positioned adjacent to one of said wheels.

16. The combination device of claim 10, further including a pair of windows, each of said windows being positioned in one of said lateral walls, each of said windows being elongated and generally extending from said rear wall to said front wall.

17. The combination device of claim 10, further including a plurality of windows being positioned in said housing.

18. The combination device of claim 10, further including a covering being attached to said housing at a juncture of said front wall and said top wall and extending forward, said covering being generally co-planar with said top wall.

* * * * *